United States Patent Office 2,949,367
Patented Aug. 16, 1960

2,949,367

METHOD AND MIX FOR CANDY COATING APPLES

Lawrence S. Goldmeier, 6312 Anderson St., Philadelphia, Pa.

No Drawing. Filed Oct. 17, 1957, Ser. No. 690,602

2 Claims. (Cl. 99—134)

My invention relates to a prepackaged mix for candy coating apples and more particularly relates to a dry ingredient, inner mixture, which is prepackaged for shipment as a prepared coating for apples on a stick.

The usual practice in the preparation of a candy coating for apples is to mix in liquid form, glucose syrup, the manufacturer of the candy apples blending all of the ingredients himself. Because of the difficulty of handling viscous syrupy liquids, exacting proportions of the final candy coating could not be repeated with any degree of accuracy. Furthermore, the costs of shipping liquids are far more than shipping dry solids which have already been dehydrated. Moreover, the maker of candy apples would necessarily require help to mix the ingredients as well as equipment for weighing the materials.

It is therefore an object of my invention to provide a prepackaging preparation for candy coating apples on a stick.

Another object of my invention is to provide a method wherein accurate proportions of the ingredients may be obtained and repeated consistently in any individual batch.

Another object of my invention is to provide a prepackaged mixture for candy coating apples whereby the measuring of the various ingredients will be avoided by the manufacturer.

Another object of my invention is to provide a mix for candy coating apples whereby costs for shipping the ingredients will be appreciably decreased.

Other objects of my invention are to provide an improved device of the character described, that is easily and economically produced, which is sturdy in construction, and which is highly efficient in operation.

Referring now to a specific embodiment of my invention, I utilize the following ingredients for making the mix.

| | |
|---|---|
| Granulated sugar | lbs 5 |
| Corn syrup solids | lb 1 |
| Hardening agent | oz 1 |
| Imitation flavor | tsp. (level) 1 |

This formula produces a powdered, dry, mixed batch sufficient to candy coat approximately one hundred and twenty-five (125) apples.

The corn syrup solids comprises a mixture of dextrose, maltose and dextrins (glucose syrup containing approximately 20% by weight of water), which has been dehydrated to define a granulated powder.

The hardening agent comprises a homogeneous mixture of a vegetable stearin (setting agent), oil of cassia (cinnamon oil) and certified color (preferably red).

The imitation flavor is a conventional strawberry or cherry entrapped flavor containing esters, aldehydes, ketones, essential oils, gum and sugar tinted with certified color.

The mix is prepared simply by incorporating the sugar, corn syrup, solids, hardening agent and imitation flavor within conventional, dry mixing equipment and blending the ingredients in the proportioned quantities set forth until a homogeneous, dry ingredient, intermixture is obtained.

It is to be observed that exact proportions of ingredients are obtained repeatedly as a result of utilizing syrup solids, thereby avoiding inconsistencies in weighing or measuring viscous liquids, wherein loss occurs through dripping or adherence to the measuring vessel.

The prepared mix may be packaged in suitable cartons or polyethylene bags for the manufacturer of candy apples or to the ultimate consumer who desires to make his own. The batch mix set forth above for making approximately 125 candy coated apples is simply placed in a cooking vessel with one pint of water and heated to a temperature of 300° F. Each apple is dipped in the heated liquid and then put aside to cool and harden the coating. When the candy coated apple is completed following the hereinabove disclosed process, the coating is hard and brittle, and this has never been achieved in the prior art.

It is to be observed that the utilizing of a dry mix will save considerable freight charges during shipment.

Although my invention has been described in considerable detail, such description is intended as being illustrative rather than limiting, since the invention may be variously embodied, and the scope of the invention is to be determined as claimed.

I claim as my invention:

1. A method for candy coating apples which comprises placing in a cooking vessel a homogeneous dry mix consisting essentially of granulated sugar, corn syrup solids, a hardening agent and imitation flavor, the ratio of sugar to syrup solids being about 5 to 1 by weight, the ratio of hardening agent to the combined sugar and syrup solids being about 1 to 96 by weight and the amount of flavoring being sufficient to impart the desired flavor to the mix, adding water in the ratio of about 1 to 6 by weight to the mix in the cooking vessel, heating the thus wetted mix to a temperature of about 300° F., and while the mix thus produced is at said temperature, dipping an apple thereinto and thereafter removing the dipped apple to cool and harden the coating.

2. A dry mix for candy coating apples consisting essentially of granulated sugar, corn syrup solids, hardening agent and imitation flavor, the ratio of sugar to syrup solids being 5 to 1 by weight, the ratio of hardening agent to the combined sugar and syrup solids being 1 to 96 by weight and the amount of flavoring agent being sufficient to impart the desired flavor to said mix.

References Cited in the file of this patent

UNITED STATES PATENTS

| | | |
|---|---|---|
| 2,558,234 | Canfield | June 26, 1951 |
| 2,682,472 | Wagner | June 29, 1954 |